(12) United States Patent
Choi (10) Patent No.: US 11,686,429 B2
(45) Date of Patent: Jun. 27, 2023

(54) SUPPORTING ASSEMBLY AND FRAME HAVING SAME

(71) Applicant: Inno-Sports Co., Ltd., Xiamen (CN)

(72) Inventor: Kwan Jun Choi, Xiamen (CN)

(73) Assignee: Inno-Sports Co., Ltd., Xiamen (CN)

( * ) Notice: Subject to any disclaimer, the term of this patent is extended or adjusted under 35 U.S.C. 154(b) by 146 days.

(21) Appl. No.: 17/142,668

(22) Filed: Jan. 6, 2021

(65) Prior Publication Data

US 2021/0222823 A1    Jul. 22, 2021

(30) Foreign Application Priority Data

Jan. 20, 2020    (CN) .......................... 202020132814.1

(51) Int. Cl.
| | | |
|---|---|---|
| *A47B 3/08* | (2006.01) |
| *F16M 11/38* | (2006.01) |
| *A47B 3/00* | (2006.01) |

(52) U.S. Cl.
CPC .............. *F16M 11/38* (2013.01); *A47B 3/002* (2013.01); *A47B 3/08* (2013.01)

(58) Field of Classification Search
USPC ........................................... 248/188.1, 188.6
See application file for complete search history.

(56) References Cited

U.S. PATENT DOCUMENTS

| | | |
|---|---|---|
| 1,063,642 A | 6/1913 | Birdsell |
| 2,136,569 A | 11/1938 | Trimpi |
| 2,803,033 A | 8/1957 | Rachman |
| 2,803,050 A | 8/1957 | Birger |
| 2,868,599 A | 1/1959 | Roggio |
| 3,075,809 A | 1/1963 | Wilson |
| 3,187,373 A | 6/1965 | Fisher |
| 3,368,504 A | 2/1968 | Cohen |
| 3,410,232 A | 11/1968 | Bills |
| 3,410,327 A | 11/1968 | Ausnit |
| 3,861,328 A | 1/1975 | Lawless |

(Continued)

FOREIGN PATENT DOCUMENTS

| | | |
|---|---|---|
| CA | 2971886 A1 | 12/2018 |
| DE | 4321853 A1 | 1/1995 |

(Continued)

*Primary Examiner* — Alfred J Wujciak
(74) *Attorney, Agent, or Firm* — Morgan, Lewis & Bockius LLP (57) ABSTRACT

A frame includes first and second mounting assemblies pivotally connected with each other. The frame also includes first, second and third leg assemblies. The first leg assembly is pivotally connected the first mounting assembly. The second leg assembly is pivotally connected with the second mounting assembly. The third leg assembly is pivotally connected with both of the first and second mounting assemblies. The frame further includes one or more supporting assemblies to enhance stability of the frame. A supporting assembly includes first, second and third members and a controller. The first member is connected with the third leg assembly. The controller is connected with the first member and selectively movable along the first member. The second member is pivotally connected with the controller and the first mounting assembly, and the third member is pivotally connected with the controller and the second mounting assembly.

19 Claims, 6 Drawing Sheets

(56) References Cited

U.S. PATENT DOCUMENTS

| | | | |
|---|---|---|---|
| 4,111,482 A | 9/1978 | Jones | |
| 4,191,111 A | 3/1980 | Emmert | |
| 4,285,105 A | 8/1981 | Kirkpatrick | |
| 4,561,108 A | 12/1985 | Kamp | |
| 4,792,240 A | 12/1988 | Ausnit | |
| 5,325,794 A | 7/1994 | Hontani | |
| 5,392,718 A * | 2/1995 | Stevens | E04H 3/28 248/188 |
| 5,483,710 A | 1/1996 | Chan | |
| 5,676,062 A * | 10/1997 | Lloyd | A61G 13/105 108/132 |
| 5,745,954 A | 5/1998 | Shogan | |
| 5,857,229 A | 1/1999 | Magnani, Jr. | |
| 5,921,623 A | 7/1999 | Nye | |
| 6,223,366 B1 | 5/2001 | Cheng | |
| 6,347,831 B1 | 2/2002 | Nye | |
| 6,363,550 B1 | 4/2002 | Wang | |
| 6,508,262 B1 | 1/2003 | Takayama | |
| 6,530,331 B2 | 3/2003 | Stanford | |
| 6,644,734 B1 | 11/2003 | Tseng | |
| 6,843,183 B2 | 1/2005 | Strong | |
| 6,971,321 B1 | 12/2005 | Strong | |
| 7,059,254 B2 | 6/2006 | Strong et al. | |
| 7,096,799 B2 | 8/2006 | Strong et al. | |
| 7,097,380 B2 | 8/2006 | Lee | |
| 7,171,910 B2 | 2/2007 | Neunzert et al. | |
| 7,260,871 B2 | 8/2007 | Borchardt | |
| 7,428,872 B2 | 9/2008 | Strong et al. | |
| 7,475,643 B2 | 1/2009 | Haney et al. | |
| 7,475,644 B2 | 1/2009 | Strong et al. | |
| 7,634,969 B2 | 12/2009 | Neunzert et al. | |
| 7,640,870 B2 | 1/2010 | Strong et al. | |
| 7,644,667 B2 | 1/2010 | Strong et al. | |
| 7,735,431 B2 | 6/2010 | Neunzert et al. | |
| 7,874,303 B2 | 1/2011 | Xie | |
| 8,006,630 B2 | 8/2011 | Strong et al. | |
| 8,033,228 B2 | 10/2011 | Haney et al. | |
| 8,042,475 B2 | 10/2011 | Larcom et al. | |
| 8,113,130 B2 | 2/2012 | Leng | |
| 8,132,517 B2 | 3/2012 | Leng | |
| 8,156,875 B2 | 4/2012 | Neunzert et al. | |
| 8,302,541 B2 | 11/2012 | Haney et al. | |
| 8,342,107 B2 | 1/2013 | Mover et al. | |
| 8,534,205 B1 | 9/2013 | Johnson et al. | |
| 8,578,865 B2 | 11/2013 | Haney et al. | |
| 8,622,007 B2 | 1/2014 | Peery et al. | |
| 8,746,155 B2 | 6/2014 | Haney et al. | |
| 8,757,069 B2 | 6/2014 | Peery et al. | |
| 8,904,943 B2 | 12/2014 | Jin | |
| 9,027,952 B2 | 5/2015 | Zhu | |
| 9,103,368 B2 | 8/2015 | Mendes | |
| D748,418 S | 2/2016 | Johnson et al. | |
| 9,277,808 B2 | 3/2016 | Cai et al. | |
| 9,282,812 B2 | 3/2016 | Chang | |
| D756,694 S | 5/2016 | Johnson et al. | |
| 9,351,563 B2 | 5/2016 | Bennett et al. | |
| 9,462,880 B1 * | 10/2016 | Lin | A47B 3/087 |
| 10,159,334 B1 | 12/2018 | Wang | |
| 10,470,561 B2 | 11/2019 | Clegg et al. | |
| 11,234,525 B1 * | 2/2022 | Tsai | A47C 4/283 |
| 2003/0089286 A1 | 5/2003 | Wang | |
| 2004/0070235 A1 | 4/2004 | Gregory | |
| 2004/0187749 A1 | 9/2004 | Zhurong | |
| 2004/0195869 A1 | 10/2004 | Zhurong | |
| 2005/0005826 A1 | 1/2005 | Strong | |
| 2005/0097829 A1 | 5/2005 | Seo | |
| 2005/0103239 A1 | 5/2005 | Neunzert | |
| 2005/0241550 A1 | 11/2005 | Neunzert | |
| 2005/0279260 A1 | 12/2005 | Stanford | |
| 2006/0062632 A1 | 3/2006 | Jang | |
| 2006/0181114 A1 | 8/2006 | Nye | |
| 2006/0196395 A1 | 9/2006 | Lin | |
| 2007/0079441 A1 | 4/2007 | Chen | |
| 2008/0007831 A1 | 4/2008 | VanNimwegen | |
| 2013/0000528 A1 | 1/2013 | Jin | |
| 2013/0025509 A1 | 1/2013 | Jin | |
| 2013/0233210 A1 | 9/2013 | Jin | |
| 2014/0030012 A1 | 1/2014 | Lee | |
| 2014/0070070 A1 | 3/2014 | Shinoda | |
| 2014/0099155 A1 | 4/2014 | Chen | |
| 2014/0130837 A1 | 5/2014 | Sy-Facunda | |
| 2016/0348395 A1 | 12/2016 | Jin | |
| 2017/0013955 A1 | 1/2017 | Lin | |
| 2017/0325592 A1 * | 11/2017 | Suh | A47C 17/04 |
| 2017/0340100 A1 | 11/2017 | Tsai | |
| 2018/0153302 A1 | 6/2018 | Jiang | |
| 2018/0171648 A1 * | 6/2018 | Woodward | E04G 1/30 |
| 2019/0150608 A1 | 5/2019 | Johnson et al. | |
| 2019/0284831 A1 | 9/2019 | Volin | |
| 2019/0292808 A1 | 9/2019 | Dotterweich | |
| 2020/0029684 A1 | 1/2020 | Jiang | |
| 2020/0390233 A1 * | 12/2020 | Leng | A47C 4/04 |
| 2021/0112968 A1 | 4/2021 | Ponomar | |
| 2021/0177135 A1 | 6/2021 | Leng | |
| 2021/0274929 A1 | 9/2021 | Choi | |
| 2021/0274930 A1 | 9/2021 | Choi | |
| 2022/0022643 A1 * | 1/2022 | Choi | A47B 3/087 |

FOREIGN PATENT DOCUMENTS

| | | |
|---|---|---|
| DE | 29515948 U1 | 1/1996 |
| EP | 1492432 B1 | 10/2016 |
| WO | WO 2013000149 A1 | 1/2013 |

* cited by examiner

SUPPORTING ASSEMBLY AND FRAME HAVING SAME

CROSS-REFERENCE TO RELATED APPLICATIONS

The present application claims priority to Chinese Utility Model Application CN 202020132814.1 filed Jan. 20, 2020. The disclosure of the application is incorporated herein for all purposes by reference in its entirety.

FIELD OF THE INVENTION

The present invention generally relates to frames and, in particular, to foldable frames having supporting assemblies.

BACKGROUND

Foldable beds and tables are more and more popular these days. A typical foldable bed or table usually includes a foldable frame to support a mattress or a table panel. However, many existing foldable frames are not very stable when in use.

Given the current state of the art, there remains a need for frames that address the abovementioned issues.

The information disclosed in this Background section is provided for an understanding of the general background of the invention and is not an acknowledgement or suggestion that this information forms part of the prior art already known to a person skilled in the art.

SUMMARY OF THE INVENTION

The present disclosure provides foldable frames with enhanced stability.

In various exemplary embodiments, the present disclosure provides a foldable frame including first and second mounting assemblies pivotally connected with each other at their proximal sides. The foldable frame also includes first, second and third leg assemblies. The first leg assembly is pivotally connected with the first mounting assembly at a distal side of the first mounting assembly. The second leg assembly is pivotally connected with the second mounting assembly at a distal side of the second leg assembly. The third leg assembly is pivotally connected with the first and second mounting assemblies at the proximal sides of the first and second mounting assemblies. The foldable frame further includes first, second and third supporting assemblies. The first supporting assembly is pivotally connected with the first leg assembly and first mounting assembly and configured to control rotation of the first leg assembly with respect to the first mounting assembly. The second supporting assembly is pivotally connected with the second leg assembly and second mounting assembly and configured to control rotation of the second leg assembly with respect to the second mounting assembly. The third supporting assembly is connected with the third leg assembly and the first and second mounting assemblies, and configured to help support the first and second mounting assemblies when the frame is unfolded.

In some exemplary embodiments, a respective mounting assembly in the first and second mounting assemblies includes first and second mounting members. A corresponding supporting assembly in the first and second supporting assemblies includes first, second and third members, and a controller. The first member is pivotally connected with a corresponding leg assembly in the first and second leg assemblies. The controller is connected with the first member and selectively movable along the first member. The second member has a first end portion pivotally connected with the controller and a second end portion pivotally connected with the first mounting member of the respective mounting assembly. The third member has a first end portion pivotally connected with the controller and a second end portion pivotally connected with the second mounting member of the respective mounting assembly.

In an exemplary embodiment, the corresponding leg assembly includes an upper lateral bar, a lower lateral bar, a first leg and a second leg. The upper lateral bar has a first end portion pivotally connected with the first mounting member of the respective mounting assembly and a second end portion pivotally connected with the second mounting member of the respective mounting assembly. Each of the first and second legs has an upper end portion connected or formed with the upper lateral bar. The lower lateral bar has a first end portion connected or formed with the first leg and a second end portion connected or formed with the second leg. The first member of the corresponding supporting assembly is pivotally connected with the lower lateral bar of the corresponding leg assembly.

In some exemplary embodiments, the third supporting assembly includes first, second and third members, and a controller. The first member is connected with the third leg assembly. The controller is connected with the first member and selectively movable along the first member. The second member has a first end portion pivotally connected with the controller and a second end portion pivotally connected with the first mounting assembly through a first link member. The third member has a first end portion pivotally connected with the controller and a second end portion pivotally connected with the second mounting assembly through a second link.

In an exemplary embodiment, the first link member is rotatably connected with the first mounting assembly and the second member of the third supporting assembly is connected with the first link member, or the first link member is fixedly connected with the first mounting assembly and the second member of the third supporting assembly is pivotally connected with the first link member. The second link member is rotatably connected with the second mounting assembly and the third member of the third supporting assembly is connected with the second link member, or the second link member is fixedly connected with the second mounting assembly and the third member of the third supporting assembly is pivotally connected with the first link member.

In various exemplary embodiments, the present disclosure provides a foldable frame including first and second mounting assemblies pivotally connected with each other at their proximal sides. The foldable frame also includes first, second and third leg assemblies. The first leg assembly is pivotally connected with the first mounting assembly at a distal side of the first mounting assembly. The second leg assembly is pivotally connected with the second mounting assembly at a distal side of the second leg assembly. The third leg assembly is pivotally connected with the first and second mounting assemblies at the proximal sides of the first and second mounting assemblies. The foldable frame further includes a third supporting assembly having a first controller, and first, second and third members. The first member is connected with the third leg assembly. The first controller is connected with the first member and selectively movable along the first member. The second member is pivotally connected with the first controller and first mounting assembly to help support the first mounting assembly when the frame is unfolded. The third member is pivotally connected with the first controller and second mounting assembly to help support the second mounting assembly when the frame is unfolded.

In some exemplary embodiments, a respective member in the second and third members of the third supporting assembly is pivotally connected with a corresponding mounting assembly in the first and second mounting assemblies by a link member. In an exemplary embodiment, the respective member is fixedly connected with the link member and the link member is rotatably connected with the corresponding mounting assembly. In another exemplary embodiment, the respective member is pivotally connected with the link member and the link member is fixedly connected with the corresponding mounting assembly.

In an exemplary embodiment, the respective mounting assembly includes first and second mounting members. The link member has a first end portion connected with the first mounting member and a second end portion connected with the second mounting member.

In some exemplary embodiments, the first and second mounting assemblies are pivotally connected with each other at their proximal sides by a coupler, and the third supporting assembly is fixedly coupled with the coupler.

In some exemplary embodiments, each of the first and second mounting assemblies includes first and second mounting members. The first mounting member of the first mounting assembly and the first mounting member of the second mounting assembly are pivotally connected with each other at their proximal sides by a first coupler. The second mounting member of the first mounting assembly and the second mounting member of the second mounting assembly are pivotally connected with each other at their proximal sides by a second coupler. The third leg assembly includes an upper lateral bar having a first end portion fixedly coupled with the first coupler and a second end portion fixedly coupled with the second coupler.

In an exemplary embodiment, the third leg assembly further includes first and second legs, each having an upper end portion fixedly connected with the upper lateral bar. Each of the first and second couplers includes first, second and third segments. The first segment is disposed substantially vertically when the frame is unfolded and configured to pivotally connect proximal end portions of the first or second mounting members and fixedly connect the first or second end portion of the upper lateral bar of the third supporting assembly. The second segment is disposed substantially horizontally when the frame is unfolded and configured to abut lower surfaces of the proximal end portions of the first or second mounting members. The third segment is disposed obliquely when the frame is unfolded and configured to abut the first or second leg of the third leg assembly.

In some exemplary embodiments, each of the first and second mounting assemblies includes first and second mounting members. The first mounting member of the first mounting assembly and the first mounting member of the second mounting assembly are pivotally connected with each other at their proximal sides by a first coupler. The second mounting member of the first mounting assembly and the second mounting member of the second mounting assembly are pivotally connected with each other at their proximal sides by a second coupler. The third leg assembly includes an upper lateral bar, a lower lateral bar, a first leg and a second leg. The upper lateral bar has a first end portion fixedly coupled with the first coupler and a second end portion fixedly coupled with the second coupler. Each of the first and second legs has an upper end portion fixedly connected with the upper lateral bar. The lower lateral bar has a first end portion fixedly coupled with the first leg and a second end portion fixedly coupled with the second leg. The first member of the third supporting assembly has a lower end portion connected with the lower lateral bar and an upper end portion connected with the upper lateral bar of the third leg assembly.

In an exemplary embodiment, a respective member in the second and third members of the third supporting assembly is pivotally connected with a corresponding mounting assembly in the first and second mounting assemblies by a link member.

In some exemplary embodiments, the foldable frame further includes first and second supporting assemblies. The first supporting assembly is pivotally connected with the first leg assembly and first mounting assembly and configured to control rotation of the first leg assembly with respect to the first mounting assembly. The second supporting assembly pivotally connected with the second leg assembly and second mounting assembly and configured to control rotation of the second leg assembly with respect to the second mounting assembly.

In some exemplary embodiments, each of the first and second supporting assemblies includes a fourth member, a second controller and a fifth member. The fourth member has an end portion pivotally connected with the first or second leg assembly. The second controller is connected with the fourth member and selectively movable along the fourth member. The fifth member has an end portion pivotally connected with the second controller and another end portion pivotally connected with the first or second mounting assembly.

In an exemplary embodiment, each of the first and second mounting assemblies includes first and second mounting members. The fifth member includes a pair of members, one member having a first end portion pivotally connected with the second controller and a second end portion pivotally connected with the first mounting member and the other member having a first end portion pivotally connected with the second controller and a second end portion pivotally connected with the second mounting member.

In some exemplary embodiments, each of the first and second supporting assemblies includes a fourth member, a second controller and a fifth member. The fourth member has an end portion pivotally connected with the first or second mounting assembly. The second controller is connected with the fourth member and selectively movable along the fourth member. The fifth member has an end portion pivotally connected with the second controller and another end portion pivotally connected with the first or second leg assembly.

In various exemplary embodiments, the present disclosure provides a foldable frame including first and second mounting assemblies. Each of the first and second mounting assemblies has first and second mounting members. The foldable frame also includes first, second and third leg assemblies. The first leg assembly is pivotally connected with distal portions of the first and second mounting members of the first mounting assembly. The second leg assembly is pivotally connected with distal portions of the first and second mounting members of the second mounting assembly. The third leg assembly includes an upper lateral bar, a first leg and a second leg. Each of the first and second legs has an upper end portion fixedly connected with the upper lateral bar. The foldable frame further includes first and second couplers. Each of the first and second couplers includes first, second and third segments. The first segment is disposed substantially vertically when the frame is unfolded and configured to pivotally connect proximal end portions of the first or second mounting members and fixedly connect the first or second end portion of the upper lateral bar of the third supporting assembly. The second segment is disposed substantially horizontally when the frame is unfolded and configured to abut lower surfaces of the proximal end portions of the first or second mounting members. The third segment is disposed obliquely when the frame is unfolded and configured to abut the first or second legs of the third supporting assembly.

In an exemplary embodiment, the third leg assembly further includes a lower lateral bar having a first end portion fixedly coupled with the first leg and a second end portion fixedly coupled with the second leg. The foldable frame further includes a third supporting assembly. The third supporting assembly includes a first controller, first and second link members, and first, second and third members. The first member has a lower end portion connected with the lower lateral bar and an upper portion coupled with the upper lateral bar of the third leg assembly. The first controller is connected with the first member and selectively movable along the first member. The first link member has a first end portion rotatably connected with the first mounting member and a second end portion rotatably connected with the second mounting member of the first mounting assembly. The second member is pivotally connected with the first controller, and fixedly connected with the first link member. The second link member has a first end portion rotatably connected with the first mounting member and a second end portion rotatably connected with the second mounting member of the second mounting assembly. The third member is pivotally connected with the first controller, and fixedly connected with the second link member.

In another exemplary embodiment, the third leg assembly further includes a lower lateral bar having a first end portion fixedly coupled with the first leg and a second end portion fixedly coupled with the second leg. The foldable frame further includes a third supporting assembly. The third supporting assembly includes a first controller, first and second link members, and first, second and third members. The first member has a lower end portion connected with the lower lateral bar and an upper portion coupled with the upper lateral bar of the third leg assembly. The first controller is connected with the first member and selectively movable along the first member. The first link member has a first end portion fixedly connected with the first mounting member and a second end portion fixedly connected with the second mounting member of the first mounting assembly. The second member is pivotally connected with the first controller, and pivotally connected with the first link member. The second link member has a first end portion fixedly connected with the first mounting member and a second end portion fixedly connected with the second mounting member of the second mounting assembly. The third member is pivotally connected with the first controller, and pivotally connected with the second link member.

The supporting assemblies and frames of the present disclosure have other features and advantages that will be apparent from, or are set forth in more detail in, the accompanying drawings, which are incorporated herein, and the following Detailed Description, which together serve to explain certain principles of exemplary embodiments of the present disclosure.

BRIEF DESCRIPTION OF THE DRAWINGS

The accompanying drawings, which are incorporated into and constitute a part of this specification, illustrate one or more exemplary embodiments of the present disclosure and, together with the Detailed Description, serve to explain the principles and implementations of exemplary embodiments of the invention.

As will be apparent to those of skill in the art, the components illustrated in the figures described above are combinable in any useful number and combination. The figures are intended to be illustrative in nature and are not limiting.

DETAILED DESCRIPTION

Reference will now be made in detail to implementation of exemplary embodiments of the present disclosure as illustrated in the accompanying drawings. The same reference indicators will be used throughout the drawings and the following detailed description to refer to the same or like parts. Those of ordinary skill in the art will understand that the following detailed description is illustrative only and is not intended to be in any way limiting. Other embodiments of the present disclosure will readily suggest themselves to such skilled persons having benefit of this disclosure.

In the interest of clarity, not all of the routine features of the implementations described herein are shown and described. It will be appreciated that, in the development of any such actual implementation, numerous implementation-specific decisions are made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Many modifications and variations of the exemplary embodiments set forth in this disclosure can be made without departing from the spirit and scope of the exemplary embodiments, as will be apparent to those skilled in the art. The specific exemplary embodiments described herein are offered by way of example only, and the disclosure is to be limited only by the terms of the appended claims, along with the full scope of equivalents to which such claims are entitled.

Embodiments of the present invention are described in the context of foldable frames. The frames can be used to make benches, tables, beds or the like. The frames are of various sizes and of various shapes including but not limited to rectangles and squares. In addition, the frames can be made of various materials including but not limited to metals (e.g., iron, steel, and aluminum), plastics and woods. In some exemplary embodiments, some components of a frame (e.g., bars) are made of metals or the like while some other components (e.g., controllers, anti-slip members) are made of plastics, rubbers or the like.

A frame of the present disclosure generally includes first and second mounting assemblies pivotally connected with each other at their proximal sides so that the first and second mounting assemblies are foldable onto each other. A frame of the present disclosure also includes one or more leg assemblies to support the mounting assemblies. In some exemplary embodiments, a frame of the present disclosure further includes one or more supporting assemblies, each connecting a leg assembly with at least one of the first and second mounting assemblies. The one or more supporting assemblies are configured to control rotation of the one or more leg assemblies, to stabilize the one or more leg assemblies when the frame is unfolded, and/or to help support the mounting assemblies when the frame is unfolded. As such, the frame of the present disclosure is stable when in use and is convenient to carry around when folded.

Referring now to FIGS. 1A-4, there is depicted exemplary foldable frame 100 in accordance with some exemplary embodiments of the present disclosure. Frame 100 includes a first mounting assembly such as first mounting assembly 110a and a second mounting assembly such as second mounting assembly 110b. The first and second mounting assemblies can be but do not necessarily have to be identical or symmetric with respect to each other. By way of example, first mounting assembly 110a and second mounting assembly 110b are illustrated to be substantially the same and disposed symmetrically with respect to each other.

The first and second mounting assemblies are pivotally connected with each other at their proximal sides, for instance, by one or more couplers such as coupler 160. As used herein, the sides at which first and second mounting assemblies are connected to each other are referred to as their proximal sides, and the sides opposite the proximal sides are referred to as their distal sides. For instance, in FIG. 1A, the proximal sides of first and second mounting assemblies are in the middle of the foldable frame. The distal sides correspond to the left and right sides of the figure. It should be noted that the term "middle" as used herein does not necessarily mean the center of the frame, and the term "side" does not necessarily mean an outmost edge of the frame.

In some exemplary embodiments, each of the first and second mounting assemblies includes a first mounting member and a second mounting member. The first mounting members of the two mounting assemblies are pivotally connected with each other at their proximal end portions, and the second mounting members of the two mounting assemblies are pivotally connected with each other at their proximal end portions. For instance, in an exemplary embodiment, each of first mounting assembly 110a and second mounting assembly 110b includes first mounting member 111 and second mounting member 112. The proximal end portions of the first mounting members of the two mounting assemblies are pivotally connected with each other by a first coupler (e.g., coupler 160 at the left upper side of FIG. 1B) and the proximal end portions of the second mounting members of the two mounting assemblies are pivotally connected with each other by a second coupler (e.g., coupler 160 at the right lower side of FIG. 1B). The first and second mounting members can be but do not necessarily have to be straight or parallel to each other, and can be but do not necessarily have to be separated from each other.

Frame 100 also includes one or more leg assemblies. For instance, in some exemplary embodiments, frame 100 includes three leg assemblies, which can be configured the same as or differently from each other. By way of example, frame 100 is illustrated with first leg assembly 120a, second leg assembly 120b and third leg assembly 140, of which the first and second leg assemblies are substantially the same as each other. The first leg assembly is pivotally connected with the first mounting assembly at a distal side of the first mounting assembly. The second leg assembly is pivotally connected with the second mounting assembly at a distal side of the second mounting assembly. The third leg assembly is pivotally connected with both of the first and second mounting assemblies at the proximal sides of the first and second mounting assemblies.

First leg assembly 120a is pivotally connected with first mounting assembly 110a, and second leg assembly 120b is pivotally connected with second mounting assembly 110b. For instance, in some exemplary embodiments, the first or second leg assembly includes an upper lateral bar such as upper lateral bar 121 having a first end portion pivotally connected with first mounting member 111 of the first or second mounting assembly and a second end portion pivotally connected with second mounting member 112 of the first or second mounting assembly.

In some exemplary embodiments, the first or second leg assembly also includes one or more legs such as first leg 124 and second leg 125. The first and second legs can be but do not necessarily have to be straight or parallel to each other, and can be but do not necessarily have to be separated from each other. Each of the first and second legs has an upper end portion connected or formed with the upper lateral bar of the first or second leg assembly. In some exemplary embodiments, the first or second leg assembly further includes a lower lateral bar such as lower lateral bar 122 disposed between the first and second legs. The lower lateral bar has a first end portion connected or formed with the first leg and a second end portion connected or formed with the second leg of the first or second leg assembly.

In some exemplary embodiments, the first or second leg assembly includes additional, optional or alternative components. For instance, in some exemplary embodiments, the first or second leg assembly further includes a base such as base 123, with which lower end portions of the first and second legs are connected or formed. In an exemplary embodiment, the base is provided with one or more anti-slip members such as anti-slip member 126 to help stabilize the frame when in use. The anti-slip member can be a grip, a tube, a tape, a pad, or the like.

Third leg assembly 140 is pivotally connected with both of the first and second mounting assemblies. For instance, in some exemplary embodiments, leg assembly 140 includes an upper lateral bar such as upper lateral bar 141 having a first end portion fixedly coupled with the first coupler (e.g., coupler 160 at the left upper side of FIG. 1B) and a second end portion fixedly coupled with the second coupler (e.g., coupler 160 at the right lower side of FIG. 1B). Upper lateral bar 141 can be configured the same as or differently from upper lateral bar 121.

Similar to the first or second leg assembly, in some exemplary embodiments, third leg assembly 140 also includes one or more legs such as first leg 144 and second leg 145. Each of the first and second legs has an upper end portion connected to or formed with the upper lateral bar of the third leg assembly. In some exemplary embodiments, third leg assembly 140 also includes a lower lateral bar such as lower lateral bar 142 disposed between the first and second legs. The lower lateral bar has a first end portion connected or formed with the first leg and a second end portion connected or formed with the second leg of the third leg assembly. The first and second legs of the third leg assembly can be but do not necessarily have to be the same as the first and second legs of the first or second leg assembly. Also, the first and second legs of the third leg assembly can be but do not necessarily have to be straight or parallel to each other. Further, the first and second legs of the third leg assembly can be but do not necessarily have to be separated from each other.

In some exemplary embodiments, third leg assembly 140 includes additional, optional or alternative components. For instance, in some exemplary embodiments, third leg assembly 140 further includes a base such as base 143, with which lower end portions of the first and second legs are connected or formed. In an exemplary embodiment, the base is provided with one or more anti-slip members such as anti-slip member 146 to help stabilize the frame when in use. Base 143 and anti-slip member 146 of the third leg assembly can be but do not necessarily have to be the same as base 123 and anti-slip member 126 of the first or second leg assembly.

In various exemplary embodiments, frame 100 further includes one or more supporting assemblies, each configured to control rotation of a leg assembly, to stabilize a leg assembly when unfolded, or to help support one or more mounting assemblies. For instance, in some exemplary embodiments, frame 100 includes three supporting assemblies, which can be configured the same as or differently from each other. By way of example, frame 100 is illustrated with first supporting assembly 130a, second supporting assembly 130b and third supporting assembly 150, of which the first and second supporting assemblies are substantially the same as each other. The first supporting assembly is connected with the first leg assembly and the first mounting assembly. The second supporting assembly is connected with the second leg assembly and the second mounting assembly. The third supporting assembly is connected with the third leg assembly and with both of the first and second mounting assemblies. Examples of supporting assemblies are disclosed in U.S. patent application Ser. No. 16/951,461, the disclosure of the application is incorporated herein for all purposes by reference in its entirety.

First supporting assembly 130a is pivotally connected with first leg assembly 120a and first mounting assembly 110a. Similarly, second supporting assembly 130b is pivotally connected with second leg assembly 120b and second mounting assembly 110b. For instance, in some exemplary embodiments, the first or second supporting assembly includes a first member such as first member 131, a controller such as controller 132, a second member such as second member 133 and a third member such as third member 134. First member 131 is pivotally connected with lower lateral bar 122 of the first or second leg assembly. Controller 132 is connected with first member 131 and selectively movable along the first member. In an exemplary embodiment, controller 132 is configured to be a slider or to include a slider similar to those disclosed in U.S. patent application Ser. Nos. 16/838,939, 16/838,944 and 16/838,947, the disclosure of each application is incorporated herein for all purposes by reference in its entirety. Second member 133 has a first end portion pivotally connected with controller 132 and a second end portion pivotally connected with first mounting member 111 of the first or second mounting assembly. Third member 134 has a first end portion pivotally connected with controller 132 and a second end portion pivotally connected with second mounting member 112 of the first or second mounting assembly. In an alternative embodiment, each of second member 133 and third member 134 has the second end portion pivotally connected with the first or second leg assembly (e.g., lower lateral bar 122 the first or second leg assembly) and first member 131 pivotally connected with the first or second mounting member (e.g., through a link member or the like).

Figure 1A:
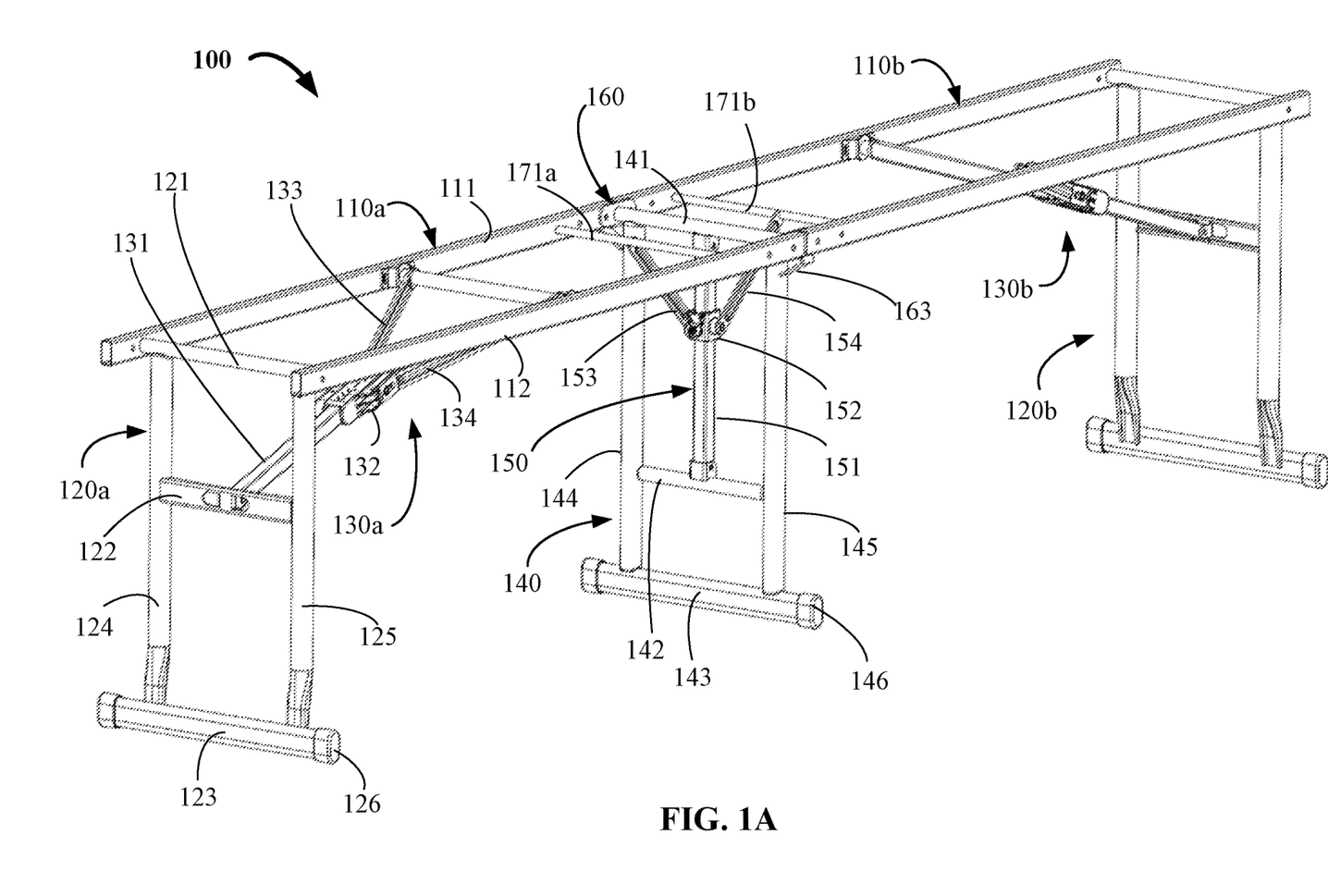
FIG. 1A is a perspective view illustrating an exemplary foldable frame in an unfolded state in accordance with exemplary embodiments of the present disclosure.
Figure 3:
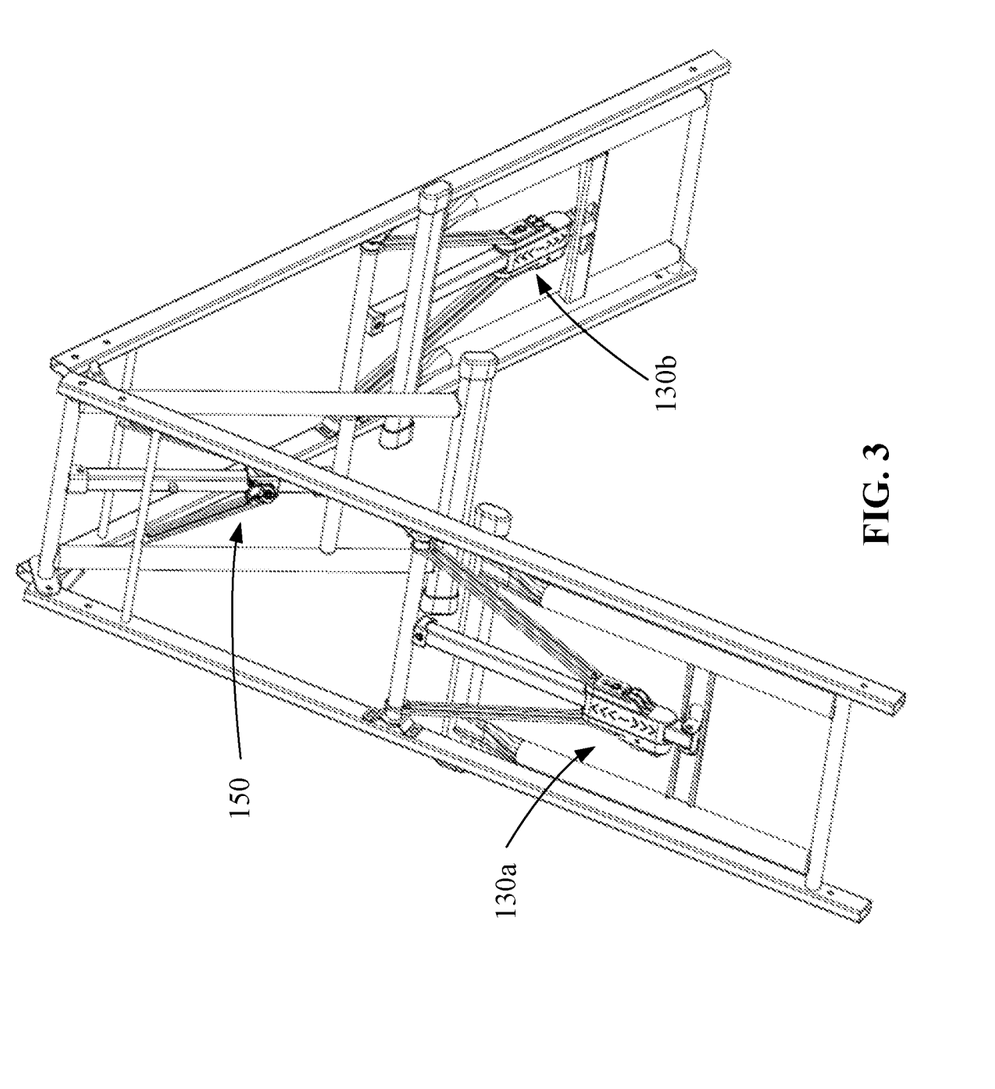
FIG. 3 is a perspective view illustrating the foldable frame of FIG. 1A in an intermediate state in accordance with exemplary embodiments of the present disclosure.
Figure 4:
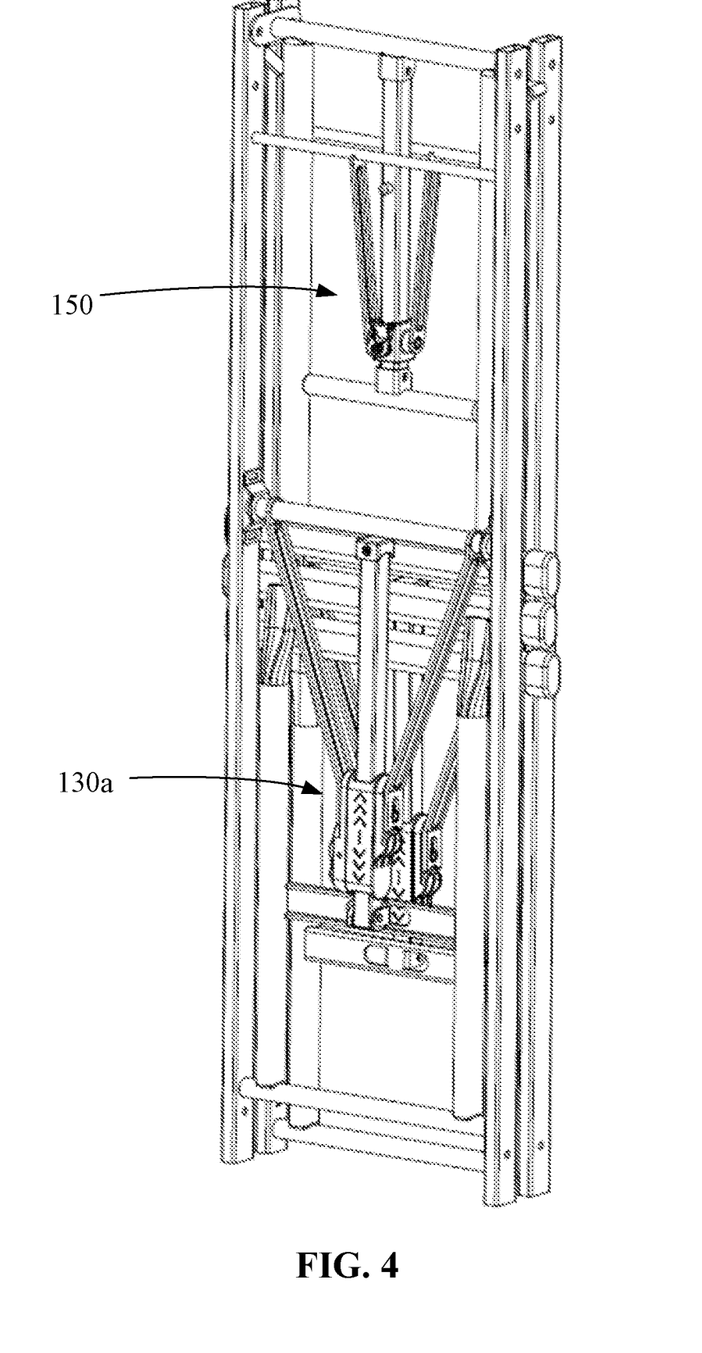
FIG. 4 is a perspective view illustrating the foldable frame of FIG. 1A in a folded state in accordance with exemplary embodiments of the present disclosure.

First supporting assembly 130a is configured to control the rotation of first leg assembly 120a with respect to first mounting assembly 110a, and when the frame is unfolded, to stabilize first leg assembly 120a and help support first mounting assembly 110a. Similarly, second supporting assembly 130b is configured to control the rotation of second leg assembly 120b with respect to second mounting assembly 110b, and when the frame is unfolded, to stabilize second leg assembly 120b and help support second mounting assembly 110b. For instance, as the controller moves along the length direction of the first member, the second and third members move toward or away from the first member, resulting in shortening or lengthening the total length of the first or second supporting assembly. In the meantime, each of the first, second and third supporting members also rotates. For instance, the first member rotates around the pivoting axis at which the first member is pivotally connected with the first or second leg assembly. The second member rotates around the pivoting axis at which the second member is pivotally connected with the controller, and rotates around the pivoting axis at which the second member is pivotally connected with the first mounting member. The third member rotates around the pivoting axis at which the third member is pivotally connected with the controller, and rotates around the pivoting axis at which the third member is pivotally connected with the second mounting member. As such, the first or second supporting assembly allows the first or second leg assembly to rotate between a use position as illustrated in FIG. 1A and a storage position as illustrated in FIGS. 3 and 4. When the first or second leg assembly is in the use position, the controller is restricted from moving along the first member (e.g., by a pin or the like), thereby preventing the first, second and third members from rotating and the total length of the supporting assembly from shortening or lengthening. As such, it prevents the leg assembly from accidental folding and thus helps stabilize the frame.

Third supporting assembly 150 is pivotally coupled with leg assembly 140, first mounting assembly 110a and second mounting assembly 110b. For instance, in some exemplary embodiments, third supporting assembly 150 includes a first member such as first member 151, a controller such as controller 152, a second member such as second member 153 and a third member such as third member 154. First member 151 is fixedly connected with third leg assembly 140. In an exemplary embodiment, first member 151 has a lower end portion connected with lower lateral bar 142 and an upper end portion connected with upper lateral bar 141. Controller 152 is connected with first member 141 and selectively movable along the first member. In an exemplary embodiment, controller 152 is configured to be a slider or to include a slider similar to those disclosed in U.S. patent application Ser. Nos. 16/838,939, 16/838,944 and 16/838,947, the disclosure of each application is incorporated herein for all purposes by reference in its entirety.

Second member 153 is pivotally connected with controller 152 and first mounting assembly 110a. For instance, in some exemplary embodiments, second member 153 has a first end portion pivotally connected with controller 152 and a second end portion connected with a first link member such as link member 171a. In an exemplary embodiment, link member 171a is rotatably connected with the first mounting assembly, e.g., link member 171a has a first end portion rotatably connected with the first mounting member and a second end portion rotatably connected with the second mounting member of the first mounting assembly. In such an embodiment, the second end portion of second member 153 can be fixedly or pivotally connected with link member 171a. Alternatively, in another exemplary embodiment, link member 171a is fixedly connected with the first mounting assembly, e.g., link member 171a has a first end portion fixedly connected with the first mounting member and a second end portion fixedly connected with the second mounting member of the first mounting assembly. In such an embodiment, the second end portion of second member 153 is pivotally connected with link member 171a.

Third member 154 is pivotally connected with controller 152 and second mounting assembly 110b. For instance, in some exemplary embodiments, third member 154 has a first end portion pivotally connected with controller 152 and a second end portion connected with a second link member such as link member 171b. Like link member 171a, link member 171b can be rotatably or fixedly connected with the second mounting assembly. Accordingly, the second end portion of third member 154 can be fixedly or pivotally connected with link member 171b.

Figure 1B:
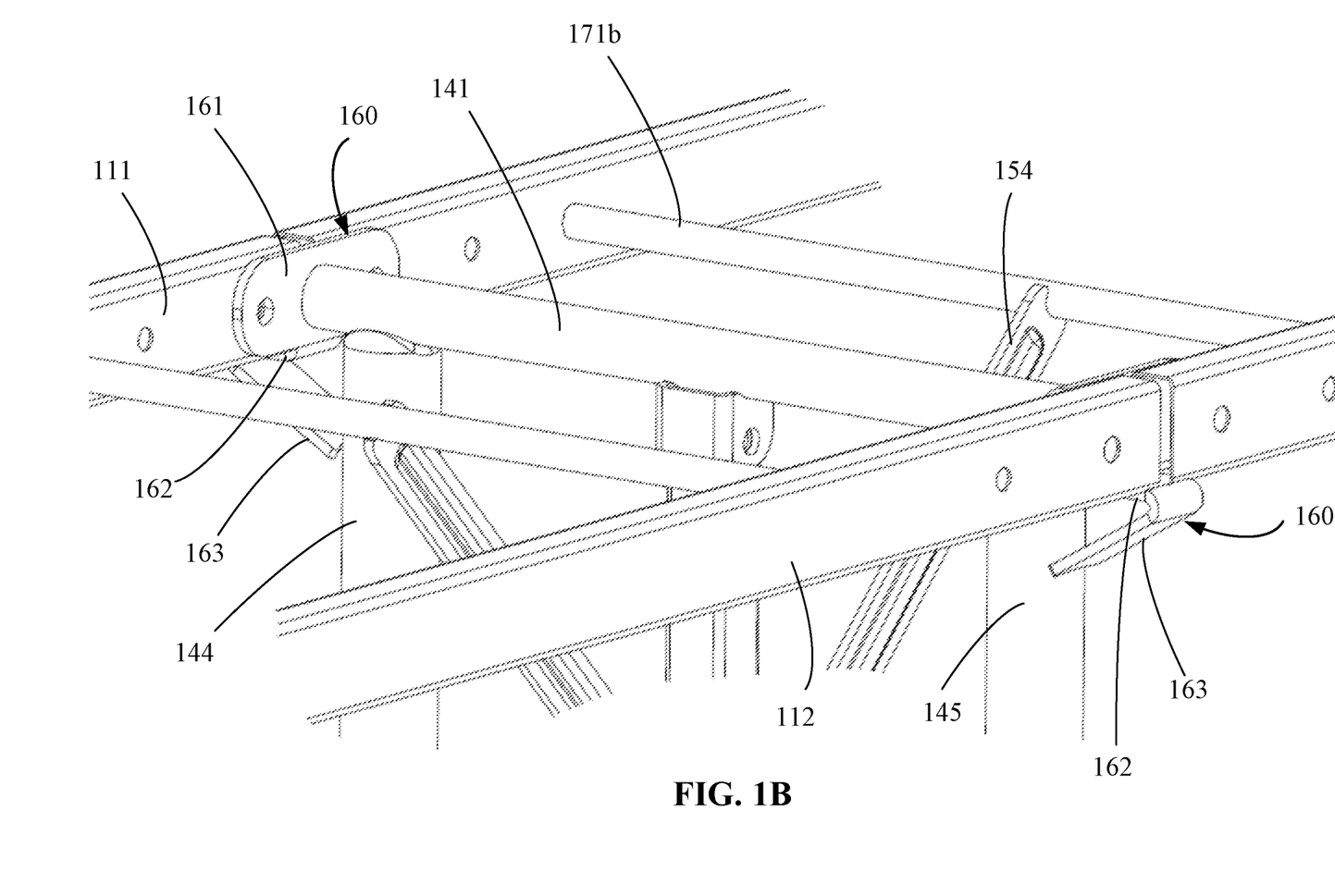
FIG. 1B is an enlarged view illustrating a portion of the foldable frame of FIG. 1A.
Figure 2A:
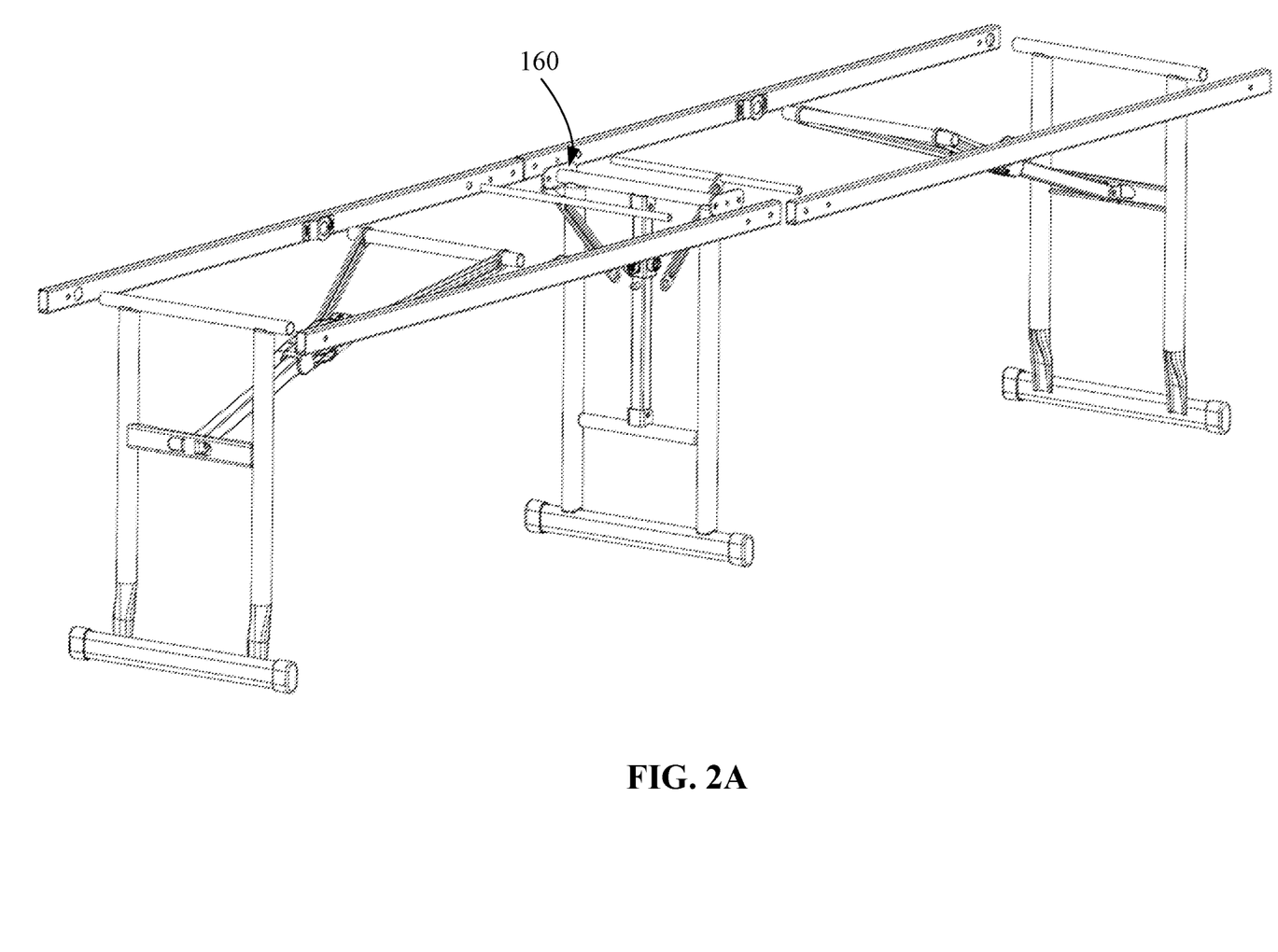
FIG. 2A is a partially dissembled view illustrating the foldable frame of FIG. 1A in accordance with exemplary embodiments of the present disclosure.
Figure 2B:
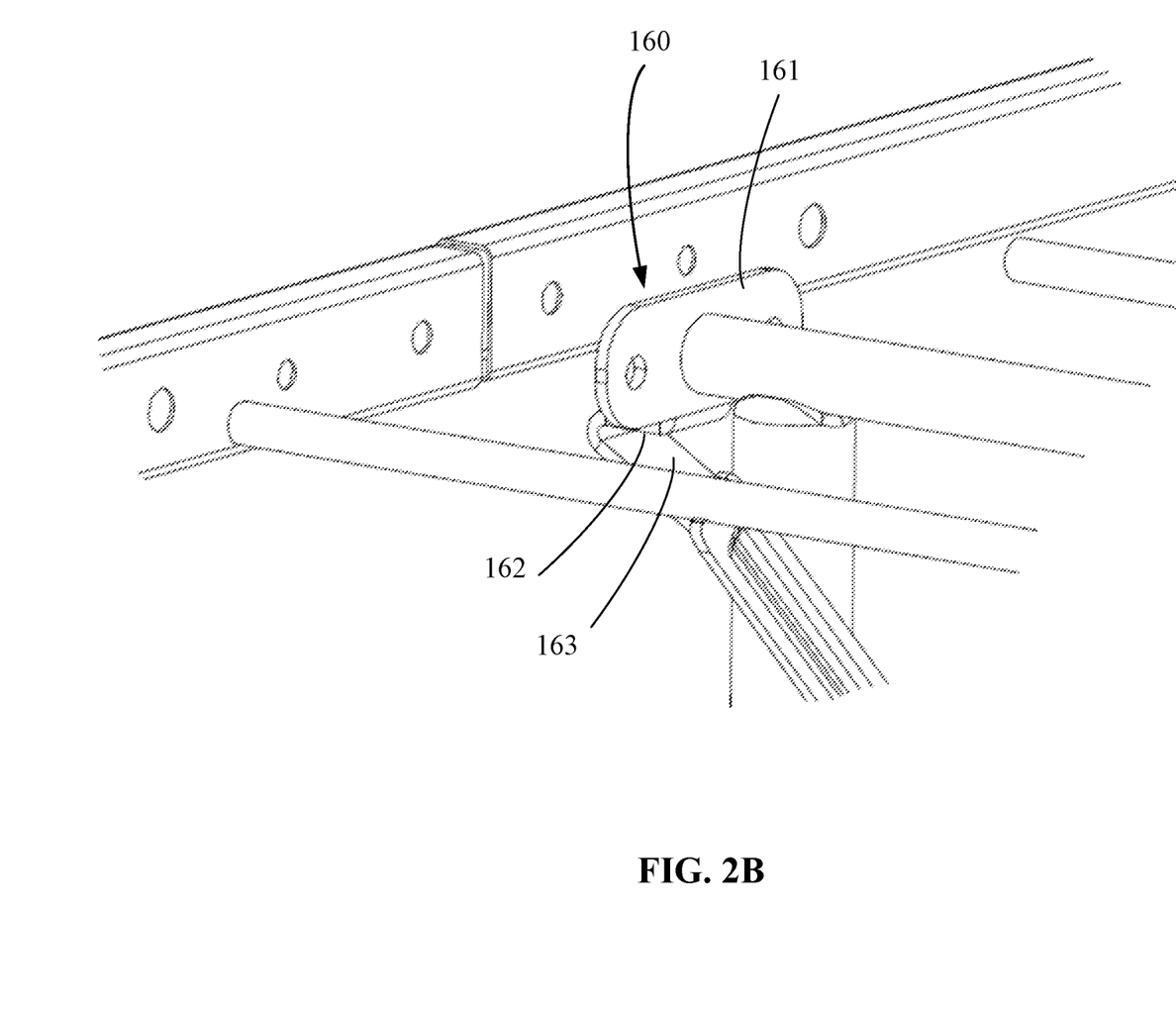
FIG. 2B is an enlarged view illustrating a portion of the foldable frame of FIG. 2A.

Referring in particular to FIGS. 1B and 2B, in some exemplary embodiments, coupler 160 includes a plurality of segments. For instance, in an exemplary embodiment, coupler includes first segment 161, second segment 162 and third segment 163. The first segment is disposed substantially vertically when the frame is unfolded and configured to pivotally connect proximal end portions of the first or second mounting members and fixedly connect the first or second end portion of the upper lateral bar of the third supporting assembly. The second segment is disposed substantially horizontally when the frame is unfolded and configured to abut lower surfaces of the proximal end portions of the first or second mounting members. The third segment is disposed obliquely when the frame is unfolded and configured to abut the first or second leg of the third supporting assembly. As such, coupler 160 assists in supporting the first and second mounting assemblies and stabilizing the frame when the frame is in use. Coupler 160 can be made of a sheet metal, plastic, or the like.

The frames of the present disclosure can be used to make benches, tables, beds or the like. For instance, an exemplary table includes a table panel coupled with and supported by a frame of the present disclosure. In some exemplary embodiments, the table panel includes a first panel unit coupled with the first mounting assembly and a second panel unit coupled with the second mounting assembly, making the table foldable in half. The frames and the furniture made of the frames of the present disclosure are easy to use, convenient to carry around and stable in use.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will be understood that the terms "top" or "bottom", "lower" or "upper", and etc. are used to describe features of the exemplary embodiments with reference to the positions of such features as displayed in the figures. It will be understood that, although the terms "first," "second," etc. may be used herein to describe various elements, these elements should not be limited by these terms. These terms are only used to distinguish one element from another. For example, a first bar could be termed a second bar, and, similarly, a second bar could be termed a first bar, without changing the meaning of the description, so long as all occurrences of the "first bar" are renamed consistently and all occurrences of the "second bar" are renamed consistently.

What is claimed is:

1. A foldable frame comprising:
    first and second mounting assemblies pivotally connected with each other at proximal sides thereof;
    first, second and third leg assemblies, wherein
        the first leg assembly is pivotally connected with the first mounting assembly at a distal side of the first mounting assembly;
        the second leg assembly is pivotally connected with the second mounting assembly at a distal side of the second mounting assembly; and
        the third leg assembly is pivotally connected with the first and second mounting assemblies at the proximal sides of the first and second mounting assemblies; and
    first, second and third supporting assemblies, wherein
        the first supporting assembly is pivotally connected with the first leg assembly and first mounting assembly and configured to control rotation of the first leg assembly with respect to the first mounting assembly;
        the second supporting assembly is pivotally connected with the second leg assembly and second mounting assembly and configured to control rotation of the second leg assembly with respect to the second mounting assembly; and
        the third supporting assembly is connected with the third leg assembly and the first and second mounting assemblies, and configured to help support the first and second mounting assemblies when the frame is unfolded;
    wherein:
    a respective mounting assembly in the first and second mounting assemblies comprises first and second mounting members;
    a corresponding supporting assembly in the first and second supporting assemblies comprises:
        a first member pivotally connected with a corresponding leg assembly in the first and second leg assemblies;
        a controller connected with the first member and selectively movable along the first member;
        a second member having a first end portion pivotally connected with the controller and a second end portion pivotally connected with the first mounting member of the respective mounting assembly; and
        a third member having a first end portion pivotally connected with the controller and a second end portion pivotally connected with the second mounting member of the respective mounting assembly.

2. The foldable frame of claim 1, wherein the corresponding leg assembly comprises:
    an upper lateral bar having a first end portion pivotally connected with the first mounting member of the respective mounting assembly and a second end portion pivotally connected with the second mounting member of the respective mounting assembly;
    first and second legs, each having an upper end portion connected or formed with the upper lateral bar; and a lower lateral bar having a first end portion connected or formed with the first leg and a second end portion connected or formed with the second leg;
wherein the first member of the corresponding supporting assembly is pivotally connected with the lower lateral bar of the corresponding leg assembly.

3. A foldable frame comprising:
first and second mounting assemblies;
first and second couplers pivotally connecting a proximal side of the first mounting assembly with a proximal side of the second mounting assembly;
first, second and third leg assemblies, wherein
the first leg assembly is pivotally connected with the first mounting assembly at a distal side of the first mounting assembly;
the second leg assembly is pivotally connected with the second mounting assembly at a distal side of the second mounting assembly; and
the third leg assembly is pivotally connected with the first and second mounting assemblies at the proximal sides of the first and second mounting assemblies; and
first, second and third supporting assemblies, wherein
the first supporting assembly is pivotally connected with the first leg assembly and first mounting assembly and configured to control rotation of the first leg assembly with respect to the first mounting assembly;
the second supporting assembly is pivotally connected with the second leg assembly and second mounting assembly and configured to control rotation of the second leg assembly with respect to the second mounting assembly;
the third supporting assembly is connected with the third leg assembly and the first and second mounting assemblies, and configured to help support the first and second mounting assemblies when the frame is unfolded,
wherein the third supporting assembly comprises:
a first member connected with the third leg assembly;
a controller connected with the first member and selectively movable along the first member;
a second member having a first end portion pivotally connected with the controller and a second end portion pivotally connected with the first mounting assembly through a first link member; and
a third member having a first end portion pivotally connected with the controller and a second end portion pivotally connected with the second mounting assembly through a second link member.

4. The foldable frame of claim 3, wherein:
the first link member is rotatably connected with the first mounting assembly and the second member of the third supporting assembly is connected with the first link member, or the first link member is fixedly connected with the first mounting assembly and the second member of the third supporting assembly is pivotally connected with the first link member; and
the second link member is rotatably connected with the second mounting assembly and the third member of the third supporting assembly is connected with the second link member, or the second link member is fixedly connected with the second mounting assembly and the third member of the third supporting assembly is pivotally connected with the first link member.

5. A foldable frame comprising:
first and second mounting assemblies pivotally connected with each other at proximal sides thereof;
a first leg assembly pivotally connected with the first mounting assembly at a distal side of the first mounting assembly;
a second leg assembly pivotally connected with the second mounting assembly at a distal side of the second mounting assembly;
a third leg assembly pivotally connected with the first and second mounting assemblies at the proximal sides of the first and second mounting assemblies; and
a third supporting assembly comprising:
a first member connected with the third leg assembly;
a first controller connected with the first member and selectively movable along the first member;
a second member pivotally connected with the first controller and first mounting assembly to help support the first mounting assembly when the frame is unfolded; and
a third member pivotally connected with the first controller and second mounting assembly to help support the second mounting assembly when the frame is unfolded.

6. The foldable frame of claim 5, wherein a respective member in the second and third members of the third supporting assembly is pivotally connected with a corresponding mounting assembly in the first and second mounting assemblies by a link member, wherein the respective member is fixedly connected with the link member and the link member is rotatably connected with the corresponding mounting assembly, or the respective member is pivotally connected with the link member and the link member is fixedly connected with the corresponding mounting assembly.

7. The foldable frame of claim 6, wherein:
the respective mounting assembly comprises first and second mounting members; and
the link member has a first end portion connected with the first mounting member and a second end portion connected with the second mounting member.

8. The foldable frame of claim 5, wherein the first and second mounting assemblies are pivotally connected with each other at the proximal sides thereof by a coupler, wherein the third supporting assembly is fixedly coupled with the coupler.

9. The foldable frame of claim 5, wherein
each of the first and second mounting assemblies comprises first and second mounting members;
the first mounting member of the first mounting assembly and the first mounting member of the second mounting assembly are pivotally connected with each other at proximal sides thereof by a first coupler;
the second mounting member of the first mounting assembly and the second mounting member of the second mounting assembly are pivotally connected with each other at proximal sides thereof by a second coupler;
the third leg assembly comprises an upper lateral bar having a first end portion fixedly coupled with the first coupler and a second end portion fixedly coupled with the second coupler.

10. The foldable frame of claim 9, wherein
the third leg assembly further comprises first and second legs, wherein each of the first and second legs has an upper end portion fixedly connected with the upper lateral bar; and each of the first and second couplers comprises:

a first segment disposed substantially vertically when the frame is unfolded and configured to pivotally connect proximal end portions of the first or second mounting members and fixedly connect the first or second end portion of the upper lateral bar of the third supporting assembly;

a second segment disposed substantially horizontally when the frame is unfolded and configured to abut lower surfaces of the proximal end portions of the first or second mounting members; and a third segment disposed obliquely when the frame is unfolded and configured to abut the first or second leg of the third leg assembly.

11. The foldable frame of claim 5, wherein
each of the first and second mounting assemblies comprises first and second mounting members;
the first mounting member of the first mounting assembly and the first mounting member of the second mounting assembly are pivotally connected with each other at proximal sides thereof by a first coupler;
the second mounting member of the first mounting assembly and the second mounting member of the second mounting assembly are pivotally connected with each other at proximal sides thereof by a second coupler;
the third leg assembly comprises:
an upper lateral bar having a first end portion fixedly coupled with the first coupler and a second end portion fixedly coupled with the second coupler;
first and second legs, each having an upper end portion fixedly connected with the upper lateral bar; and
a lower lateral bar having a first end portion fixedly coupled with the first leg and a second end portion fixedly coupled with the second leg;
wherein the first member of the third supporting assembly has a lower end portion connected with the lower lateral bar and an upper end portion connected with the upper lateral bar of the third leg assembly.

12. The foldable frame of claim 11, wherein a respective member in the second and third members of the third supporting assembly is pivotally connected with a corresponding mounting assembly in the first and second mounting assemblies by a link member, wherein the respective member is fixedly connected with the link member and the link member is rotatably connected with the first and second mounting members of the corresponding mounting assembly, or the respective member is pivotally connected with the link member and the link member is fixedly connected with the first and second mounting members of the corresponding mounting assembly.

13. The foldable frame of claim 5, further comprises:
a first supporting assembly pivotally connected with the first leg assembly and first mounting assembly and configured to control rotation of the first leg assembly with respect to the first mounting assembly; and
a second supporting assembly pivotally connected with the second leg assembly and second mounting assembly and configured to control rotation of the second leg assembly with respect to the second mounting assembly.

14. The foldable frame of claim 13, wherein each of the first and second supporting assemblies comprises a fourth member, a second controller and a fifth member, wherein:
the fourth member has an end portion pivotally connected with the first or second leg assembly;
the second controller is connected with the fourth member and selectively movable along the fourth member;
the fifth member has an end portion pivotally connected with the second controller and another end portion pivotally connected with the first or second mounting assembly.

15. The foldable frame of claim 14, wherein:
each of the first and second mounting assemblies comprises first and second mounting members; and
the fifth member comprises a pair of members, one member having a first end portion pivotally connected with the second controller and a second end portion pivotally connected with the first mounting member and the other member having a first end portion pivotally connected with the second controller and a second end portion pivotally connected with the second mounting member.

16. The foldable frame of claim 13, wherein each of the first and second supporting assemblies comprises a fourth member, a second controller and a fifth member, wherein:
the fourth member has an end portion pivotally connected with the first or second mounting assembly;
the second controller is connected with the fourth member and selectively movable along the fourth member;
the fifth member has an end portion pivotally connected with the second controller and another end portion pivotally connected with the first or second leg assembly.

17. A foldable frame comprising:
first and second mounting assemblies, each comprising first and second mounting members;
first, second and third leg assemblies, wherein
the first leg assembly is pivotally connected with distal portions of the first and second mounting members of the first mounting assembly;
the second leg assembly is pivotally connected with distal portions of the first and second mounting members of the second mounting assembly;
the third leg assembly comprises an upper lateral bar, a first leg and a second leg, wherein each of the first and second legs has an upper end portion fixedly connected with the upper lateral bar; and
first and second couplers each comprising:
a first segment disposed substantially vertically when the frame is unfolded and configured to pivotally connect proximal end portions of the first or second mounting members and fixedly connect the first or second end portion of the upper lateral bar of the third supporting assembly;
a second segment disposed substantially horizontally when the frame is unfolded and configured to abut lower surfaces of the proximal end portions of the first or second mounting members; and
a third segment disposed obliquely when the frame is unfolded and configured to abut the first or second legs of the third supporting assembly.

18. The foldable frame of claim 17, wherein the third leg assembly further comprises a lower lateral bar having a first end portion fixedly coupled with the first leg and a second end portion fixedly coupled with the second leg, the foldable frame further comprising:
a third supporting assembly comprising:
a first member having a lower end portion connected with the lower lateral bar and an upper portion connected with the upper lateral bar of the third leg assembly;
a first controller connected with the first member and selectively movable along the first member;

a first link member having a first end portion rotatably connected with the first mounting member and a second end portion rotatably connected with the second mounting member of the first mounting assembly;

a second member pivotally connected with the first controller, and fixedly connected with the first link member;

a second link member having a first end portion rotatably connected with the first mounting member and a second end portion rotatably connected with the second mounting member of the second mounting assembly; and a third member pivotally connected with the first controller, and fixedly connected with the second link member.

19. The foldable frame of claim 17, wherein the third leg assembly further comprises a lower lateral bar having a first end portion fixedly coupled with the first leg and a second end portion fixedly coupled with the second leg, the foldable frame further comprising:

a third supporting assembly comprising:

a first member having a lower end portion connected with the lower lateral bar and an upper portion connected with the upper lateral bar of the third leg assembly;

a first controller connected with the first member and selectively movable along the first member;

a first link member having a first end portion fixedly connected with the first mounting member and a second end portion fixedly connected with the second mounting member of the first mounting assembly;

a second member pivotally connected with the first controller, and pivotally connected with the first link member;

a second link member having a first end portion fixedly connected with the first mounting member and a second end portion fixedly connected with the second mounting member of the second mounting assembly; and a third member pivotally connected with the first controller, and pivotally connected with the second link member.

* * * * *